(12) United States Patent
Yoshikawa

(10) Patent No.: US 9,599,085 B2
(45) Date of Patent: Mar. 21, 2017

(54) ENGINE FUEL INJECTION DEVICE

(71) Applicant: SUZUKI MOTOR CORPORATION, Hamamatsu-shi, Shizuoka (JP)

(72) Inventor: Yukihiro Yoshikawa, Hamamatsu (JP)

(73) Assignee: SUZUKI MOTOR CORPORATION, Hamamatsu-Shi, Shizuoka (JP)

( * ) Notice: Subject to any disclaimer, the term of this patent is extended or adjusted under 35 U.S.C. 154(b) by 336 days.

(21) Appl. No.: 13/855,167

(22) Filed: Apr. 2, 2013

(65) Prior Publication Data

US 2013/0255632 A1  Oct. 3, 2013

(30) Foreign Application Priority Data

Apr. 2, 2012 (JP) ................. 2012-084154

(51) Int. Cl.
| | |
|---|---|
| F02M 69/00 | (2006.01) |
| F02D 41/06 | (2006.01) |
| F02D 41/40 | (2006.01) |
| F02N 1/00 | (2006.01) |
| F02D 41/10 | (2006.01) |

(52) U.S. Cl.
CPC ........... *F02M 69/00* (2013.01); *F02D 41/062* (2013.01); *F02D 41/105* (2013.01); *F02D 41/401* (2013.01); *F02N 1/00* (2013.01); *Y02T 10/44* (2013.01)

(58) Field of Classification Search
CPC .... F02D 41/105; F02D 41/401; F02D 41/062; F02M 69/00; F02N 1/00; Y02T 10/44
USPC .......................................... 123/445–451, 491
See application file for complete search history.

(56) References Cited

U.S. PATENT DOCUMENTS

| | | | | |
|---|---|---|---|---|
| 4,418,674 A | * | 12/1983 | Hasegawa et al. | ........... 123/491 |
| 4,941,449 A | | 7/1990 | Hoptner et al. | |
| 5,088,465 A | * | 2/1992 | DeBiasi et al. | .......... 123/406.47 |
| 5,390,641 A | * | 2/1995 | Yamada et al. | ............... 123/491 |
| 5,482,022 A | | 1/1996 | Aoki et al. | |
| 5,713,334 A | * | 2/1998 | Anamoto | ....................... 123/491 |
| 6,575,143 B2 | * | 6/2003 | Uemura et al. | ............... 123/490 |
| 6,955,161 B2 | * | 10/2005 | Suzuki et al. | ................. 123/533 |
| 2009/0030587 A1 | * | 1/2009 | Yonezawa | ............. F02D 41/009 701/103 |

FOREIGN PATENT DOCUMENTS

| | | |
|---|---|---|
| DE | 3623042 A1 | 1/1988 |
| JP | 9032605 A | 2/1997 |

OTHER PUBLICATIONS

European Search Report, dated Aug. 8, 2013, which issued during the prosecution of European Patent Application No. 13161304.4.

* cited by examiner

*Primary Examiner* — Stephen K Cronin
*Assistant Examiner* — Susan E Scharpf
(74) *Attorney, Agent, or Firm* — Troutman Sanders LLP

(57) ABSTRACT

A fuel injection device injects fuel per each cylinder in an engine having a plurality of cylinders #1 and #2. At a time of engine actuation, start timings of fuel injections are shifted per each cylinder and times within one rotation of a crankshaft is set as the injection start timings for all cylinders. At least the initial fuel injection is performed before cylinder discrimination.

1 Claim, 7 Drawing Sheets

ENGINE FUEL INJECTION DEVICE

CROSS-REFERENCE TO RELATED APPLICATIONS

This application is based upon and claims the benefit of priority of the prior Japanese Patent Application No. 2012-084154, filed on Apr. 2, 2012, the entire contents of which are incorporated herein by reference.

BACKGROUND OF THE INVENTION

[Field of the Invention]

The present invention relates to an engine fuel injection device suitable for particularly multi-cylinder fuel injection in an internal combustion engine in a motorcycle or an outboard motor.

[Description of the Related Art]

A fuel injection type multi-cylinder engine of such a kind is usually controlled by an ECU (engine control unit) so that a fuel injection is performed at a most appropriate timing in accordance with a piston position per each cylinder after discrimination of cylinders. If the fuel injection is desired to be performed at an earliest possible timing for improvement of engine startability, there is a technique in which fuel injections are performed simultaneously in respective cylinders after an ECU is activated, before cylinder discrimination.

If a battery is mounted as a power supply for driving a fuel injector in order to perform a fuel injection, a power necessary for simultaneous driving of a plurality of injectors is secured. On the other hand, for example, with regard to a motorcycle or an outboard motor, in a model whose engine is started without usage of a battery, that is, in a batteryless engine, it is compelled to depend on manpower (kick starter in the motorcycle, hand-operated recoil starter in the outboard motor). In such a case, a crankshaft of the engine is forcibly rotated by hand, and an injector being an engine load is driven by power generation of an alternator or an alternating current generator (ACG).

[Patent Document 1] Japanese Laid-open Patent Publication No. 09-32605

When the engine is started by hand or the like as described above, an engine rotation number at that time is low, that is, a crankshaft rotation speed is slow, and thus it becomes practically difficult to secure a power necessary to drive the plural injectors by the ACG. As a measure thereof, it has been conventionally necessary to increase a size of the ACG, for example, to enlarge its power generation amount.

Note that Patent Document 1 discloses an actuation time control method in a multi-cylinder engine of such a kind. It is a method where a fuel injection of a predetermined amount is each performed asynchronously to all cylinders in response to a cylinder detection signal in an actuation mode.

SUMMARY OF THE INVENTION

In view of the above circumstances, an object of the present invention is to provide an engine fuel injection device capable of realizing miniaturization or the like of an ACG while improving an engine startability by hand in particular.

An engine fuel injection device according to the present invention is an engine fuel injection device injecting fuel per each cylinder in an engine having a plurality of cylinders, and has a feature that shifts start timings of fuel injections per each cylinder and sets times within one rotation of a crankshaft as the injection start timings for all cylinders, at an engine actuation time.

Further, in the engine fuel injection device of the present invention, at least an initial fuel injection is performed before cylinder discrimination.

Further, in the engine fuel injection device of the present invention, an engine control unit is activated and the initial fuel injection is performed immediately thereafter.

Further, in the engine fuel injection device of the present invention, the initial fuel injection starts after an engine control unit is activated and a predetermined crank angle rotation is done.

Further, in the engine fuel injection device of the present invention, a fuel injection of a second or more time is performed at a predetermined crank angle synchronously with the crankshaft before the cylinder discrimination.

Simultaneous fuel injections are not performed practically to two or more cylinders among the plurality of cylinders.

DETAILED DESCRIPTION OF THE PREFERRED EMBODIMENTS

Hereinafter, a preferred embodiment of an engine fuel injection device in the present invention will be described based on the drawings.

Figure 1:
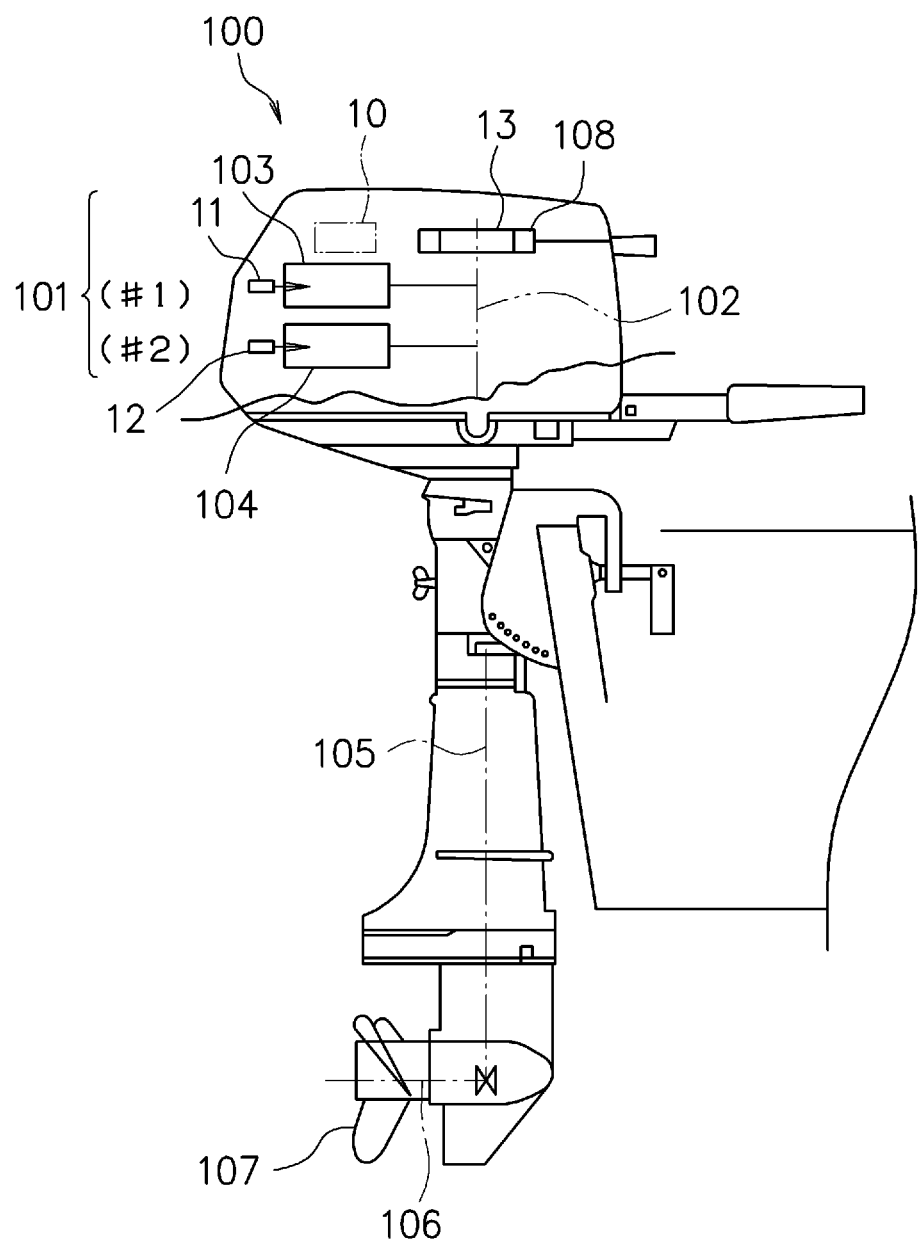
FIG. 1 is a side view of an outboard motor showing an application example of a fuel injection device according to an embodiment of the present invention.

FIG. 1 shows a side view of an outboard motor 100 as an application example of the present invention. Here, an entire configuration of the outboard motor 100 will be first described by using FIG. 1. An engine unit 101 which includes a four-cycle multi-cylinder engine is mounted on an upper part of the outboard motor 100, and a crankshaft 102 thereof is supported vertically in a manner to orient a vertical direction. In this example, the engine is a two-cylinder serial engine, for example, and a #1 cylinder 103 and a #2 cylinder 104 are disposed above and below. A drive shaft 105 connected to a lower end portion of the crankshaft 102 is disposed in a longitudinal direction, and a driving force of the drive shaft 105 is transmitted to a propeller shaft 106, to rotationally drive a propeller 107.

Injectors 11, 12 of the fuel injection device are disposed corresponding to the #1 cylinder 103 and the #2 cylinder 104, and fuel is injected at predetermined timings from those injectors 11, 12 to intake ports connected to combustion chambers of respective cylinders, though details are not illustrated. An ECU (engine control unit) 10 for controlling fuel injection timings or the like is provided at a proper place in the engine unit 101. Note that the ECU 10 controls an ignition timing or the like of an ignition plug (not shown) attached to the combustion chamber of each cylinder.

An ACG 13 is annexed to an upper end portion of the crankshaft 102 and generates and supplies a power necessary for engine actuation. In the upper end portion of the crankshaft 102 is also disposed a recoil starter 108 adjacently to the ACG 13, and as a result that an operation of the recoil starter 108 rotationally biases the crankshaft 102, the ACG 13 is driven by hand so that a power can be generated.

Figure 2:
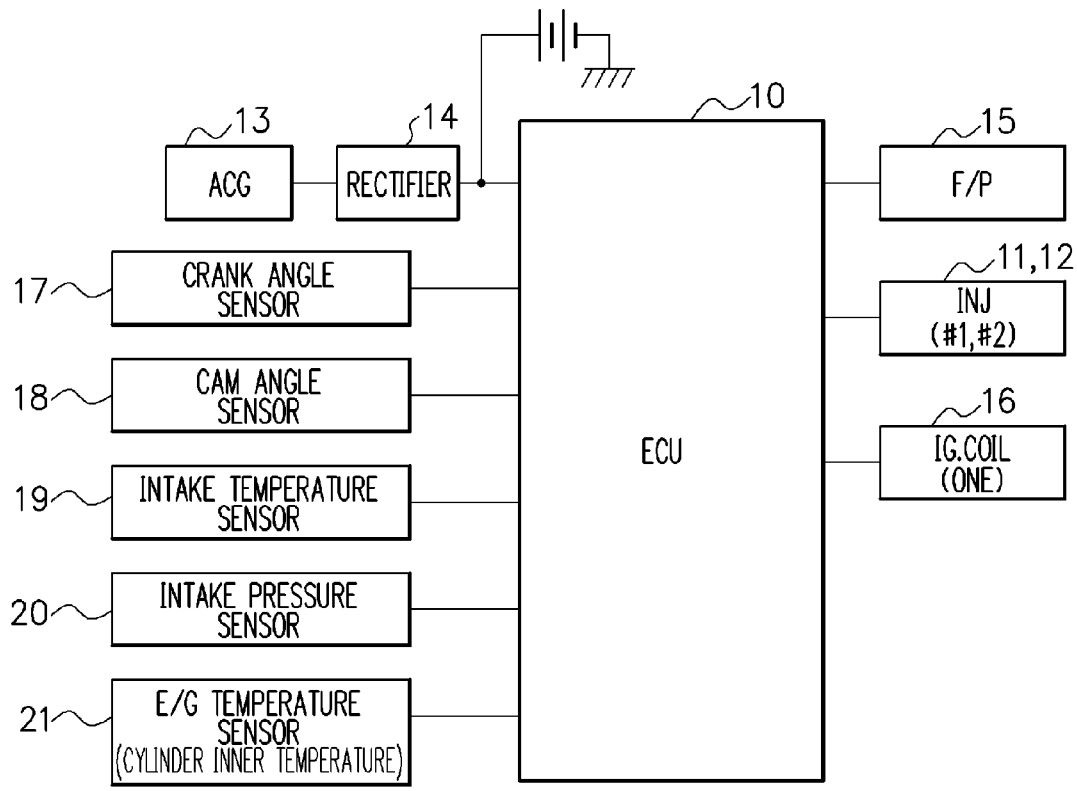
FIG. 2 is a block diagram showing a configuration example of an engine control unit and its main associated equipment according to the embodiment of the present invention.

Next, FIG. 2 concretely shows a configuration example of the ECU 10 as the engine control unit. To the ECU 10 are connected the aforementioned injectors 11, 12, ACG 13 and a rectifier 14, and are connected a fuel pump 15 being a fuel supply source to the injectors 11, 12 and an ignition coil 16 supplying the ignition plug with a power. Further, various sensors necessary for engine control, i.e., a crank angle sensor 17, a cam angle sensor 18, an intake temperature sensor 19, an intake pressure sensor 20, and, further, an engine temperature sensor 21 and so on are connected. Based on signals received from those sensors and so on, ECU 10 drive-controls the injectors 11, 12 and the ignition coil 16 being objects to be controlled according to a predetermined control program.

The crank angle sensor 17, in particular, has a gear unit made by a predetermined number of gear teeth 17a formed at regular pitches or at regular intervals along an outer peripheral portion of a rotor 17A (pulsar rotor) which synchronously rotates with the crankshaft 102, as a configuration example. Nearest to the gear unit is disposed a detection sensor 17B which detects each gear tooth by an electromagnetic pickup method and generates a pulse signal per each gear tooth. Since the number of the gear teeth is predetermined, a rotation angle of the crankshaft 102, 10° for example, is detected by the pulse signal corresponding to one gear tooth. Further, by not forming several gear teeth, a toothless portion 17b is provided in a part of the gear unit, and a reference position of the crank angle is set by using the pulse signals before and after the toothless portion 17b.

The ECU 10 calculates the crank angle and the rotation number of the crankshaft 102 based on the pulse signal inputted from the crank angle sensor 17. On the other hand, also in the cam angle sensor 18, a rotation angle of a cam shaft can be similarly detected by a pulse signal formed by a pulsar rotor synchronously rotating with the cam shaft. Thereby, a cylinder can be discriminated by the pulse signal inputted from the crank angle sensor 17 and the pulse signal inputted from the cam angle sensor 18.

Figure 9:
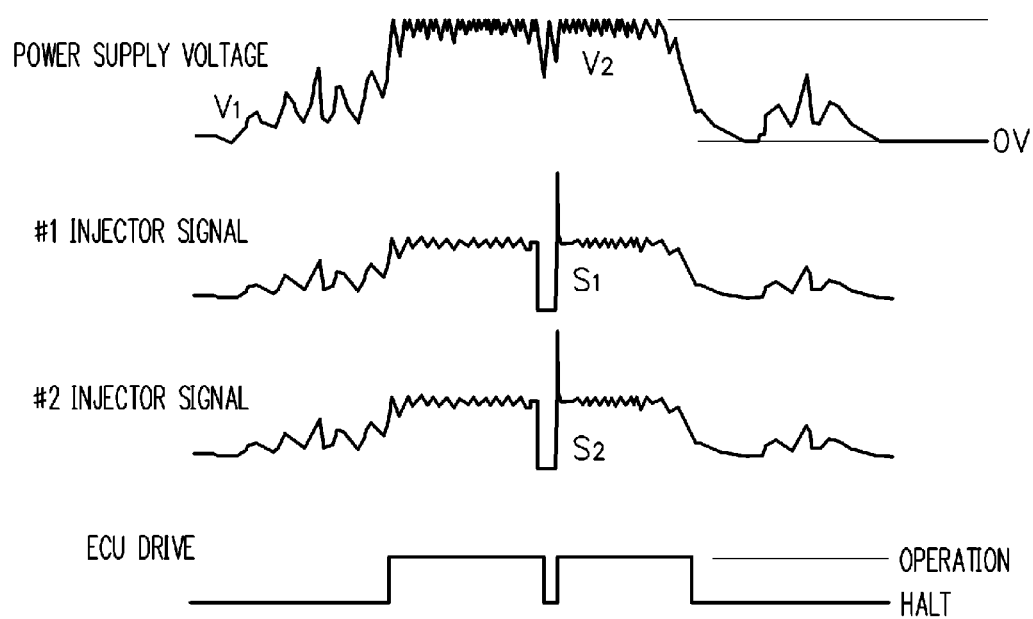
FIG. 9 is a chart showing variation states of a power supply voltage or the like at an actuation time by a recoil starter in a comparison example of the present invention.

Here, there is considered a case where, in a batteryless multi-cylinder engine as this example, an ACG 13 is driven by hand by a recoil starter 108 to make two injectors 11, 12 inject simultaneously. The case being described as a comparison example to the present invention, first, a power supply voltage $V_1$ at a start time of manual actuation gradually rises as in FIG. 9 for example, and, next, the injectors 11, 12 of #1 and #2 cylinders are driven simultaneously (signals $S_1$, $S_2$) in order to improve a startability, and simultaneous injections of fuel are performed. Power consumption builds up due to such simultaneous driving, and when the power supply voltage becomes equal to or less than a predetermined voltage $V_2$, an ECU 10 halts if nothing is done, disabling an ignition and a fuel injection thereafter.

Figure 4:
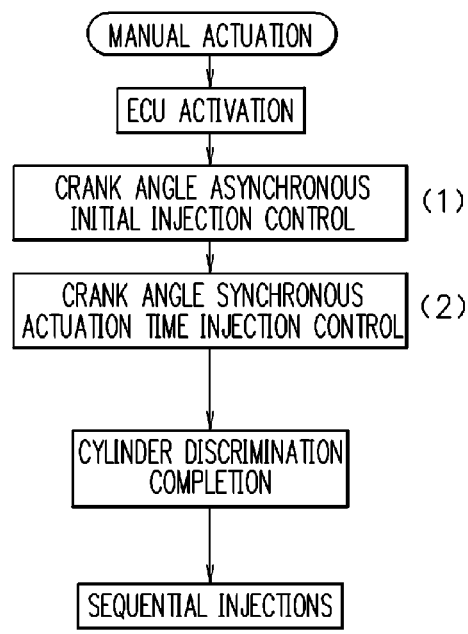
FIG. 4 is a chart schematically showing a timing control process of a fuel injection in the embodiment of the present invention.

Thus, in the present invention, at a time of engine actuation, timings of start of fuel injections are shifted per each cylinder to avoid concentration of power consumption and to disperse power consumption, so that the above is realized. FIG. 4 schematically shows a timing control process of fuel injections in the present embodiment. In the present invention, after manual actuation start and before cylinder discrimination, there are included (1) crank angle asynchronous initial injection control for obtaining an initial explosion and (2) crank angle synchronous actuation time injection control for performing an expletive linkage injection. Note that a usual sequential injection is performed after cylinder discrimination.

Figure 3:
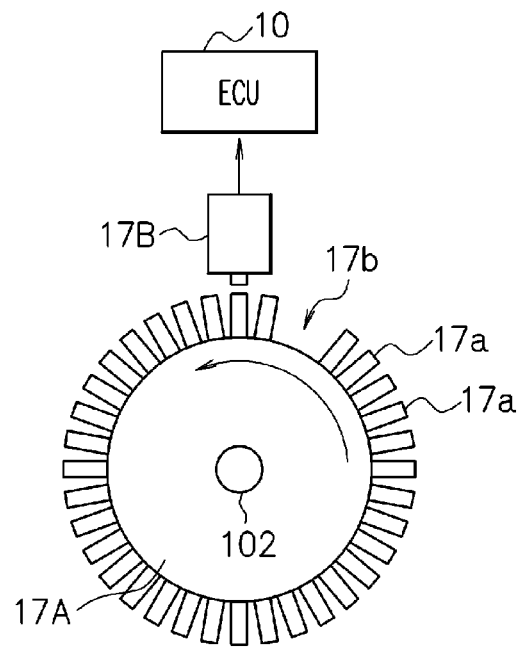
FIG. 3 is a diagram showing a constitution example of a substantial part of a crank angle sensor according to the embodiment of the present invention.
Figure 5:
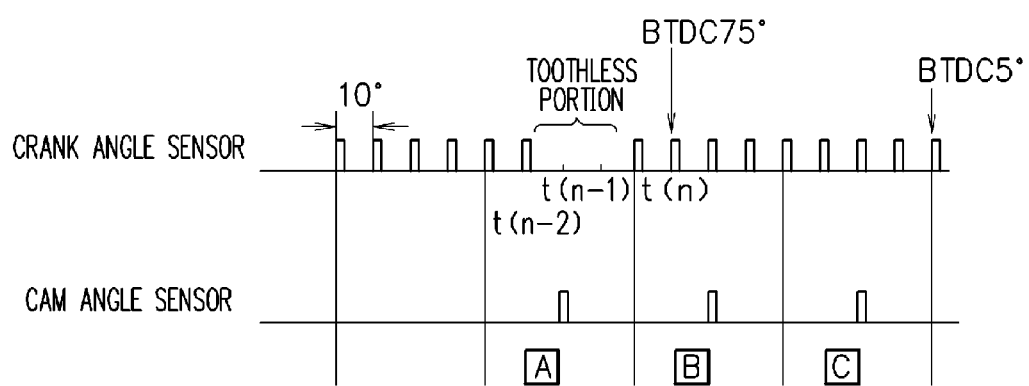
FIG. 5 is a chart showing an example of output signals of the crank angle sensor and a cam angle sensor in the embodiment of the present invention.

Next, a concrete example of fuel injection timing control in the present embodiment will be described. In the fuel injection timing control, first, by using a signal of the crank angle sensor 17, a crank angle reference position is determined by toothless judgment. As shown in FIG. 5, a period of the pulse signal of the crank angle sensor 17 being a crank angle 10°, by using the pulse signal $t_{(n-2)}$ immediately before the toothless portion 17b in the aforementioned rotor 17A (FIG. 3) and the pulse signal $t_{(n-1)}$ immediately after the toothless portion 17b, a ratio of the pulse signal period of the gear unit and a period corresponding to the toothless portion 17b is computed. A crank angle at a time of the period ratio thereof ≥2 is made a reference. Note that when the period corresponding to the toothless portion 17b is equivalent to three pulse signals the period ratio equals 3.

Further, as a crank angle reference position, by using the pulse signal $t_{(n-1)}$ immediately after the toothless portion 17b and a pulse signal $t_{(n)}$ appearing first after the pulse signal $t_{(n-1)}$, a crank angle (#1 cylinder) at a time of a period ratio thereof ≤0.5 is BTDC 75°. In this case, BTDC (Before Top Dead Center) means before top dead center in a compression process in four cycles of the engine.

Further, in cylinder discrimination, a signal of the cam angle sensor 18 is also used. In other words, it is discriminated in which process of intake, compression, explosion and exhaust the signal of the cam angle sensor 18 indicates a top dead center, for each cylinder. For example, in FIG. 5, with the toothless portion 17b of the crank angle sensor 17 being a reference, a zone is divided into zones A, B, C. Then, the cylinder is discriminated by the number of the pulse signals of the cam angle sensor 18 included in the zone. As an example, in a case of A=1, B=1, and C=0, an end point of the zone C is set/discriminated as BTDC 5° of the #1 cylinder.

Figure 6:
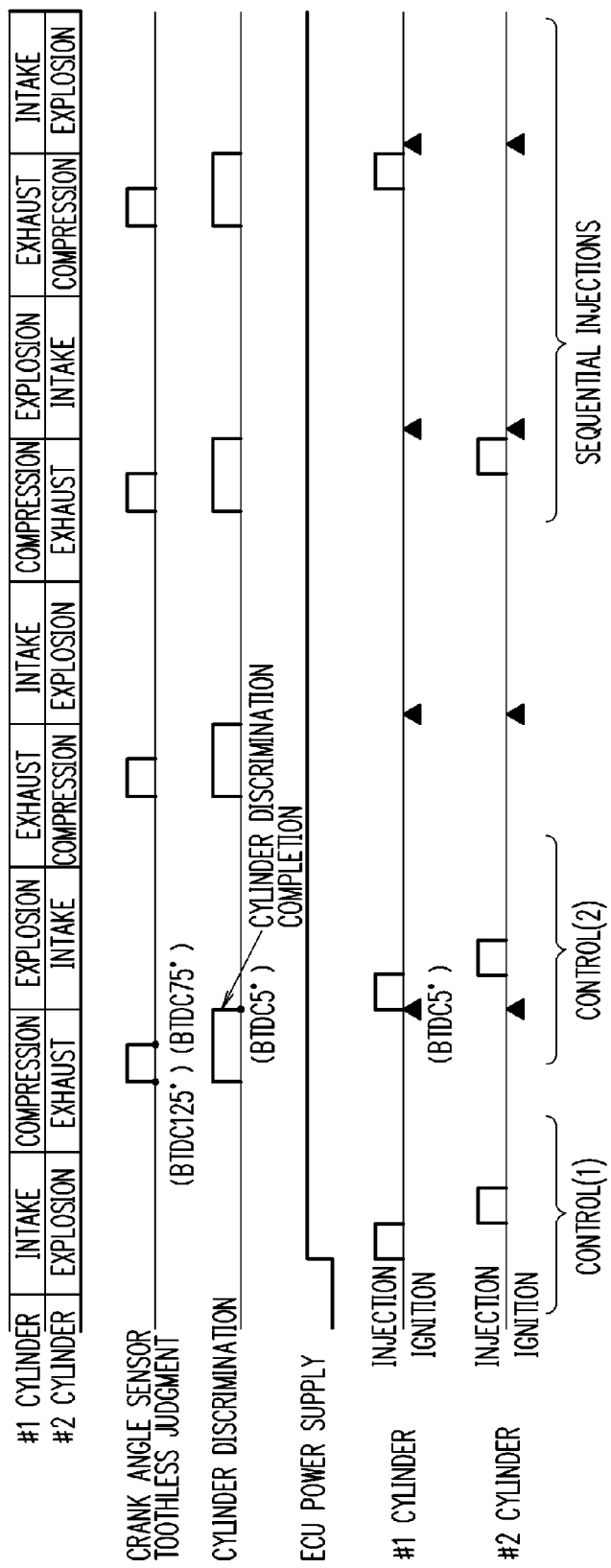
FIG. 6 is a chart showing an operation example of the fuel injection device in the embodiment of the present invention.

FIG. 6 shows a more concrete operation example of the fuel injection device of the present invention. The ACG 13 is driven by the recoil starter 108, and thereby the ECU 10 is activated. In the crank angle asynchronous initial injection control (1), an initial injection is performed first in the injector 11 of the #1 cylinder in this example. In this case, as an injection timing, for example, at the pulse signal of a predetermined number (for example, fifth) from the crank angle sensor 17, the injector 11 is valve-opened. Further, the injector 12 of the #2 cylinder is valve-opened after a certain time from valve-opening of the injector 11 of the #1 cylinder.

Figure 7:
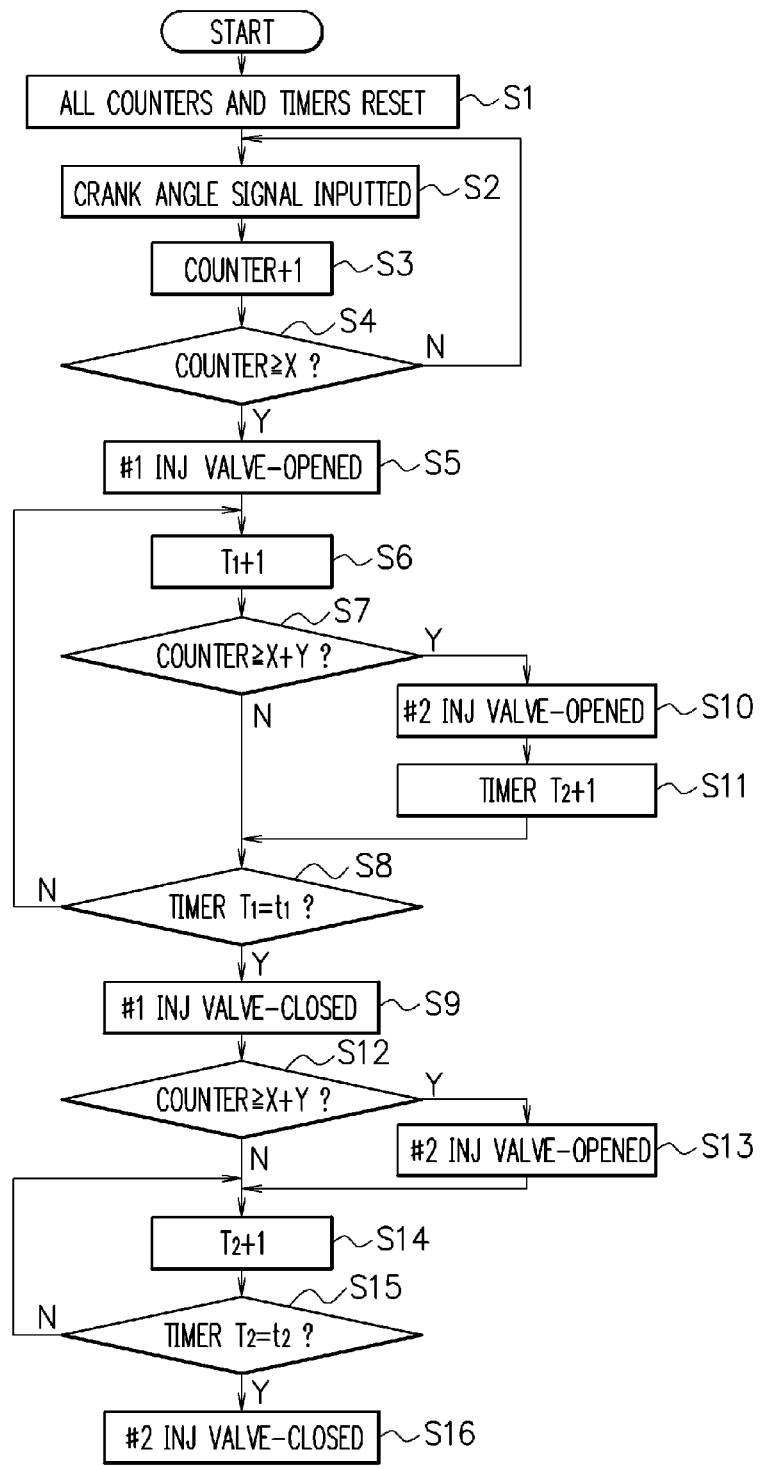
FIG. 7 is a flowchart showing an operation example of the fuel injection device at a time of crank angle asynchronous initial injection control in the embodiment of the present invention.

FIG. 7 is a flowchart showing a flow of the crank angle asynchronous initial injection control (1). After the ECU 10 is activated, all counters and timers are reset in a step S1. In a step S2 and a step S3, the pulse signals from the crank angle sensor 17 are counted and judged whether or not the number reaches a predetermined number X (step S4), and if the predetermined number of the pulse signals is obtained, the injector 11 is valve-opened in a step S5.

After valve-opening of the injector 11, the timer $T_1$ is made to start counting (step S6) and it is judged in a step S7 whether or not the pulse signal from the crank angle sensor 17 reaches a predetermined number X+Y. Even in a case where the number does not reach the predetermined number X+Y, if a predetermined time $t_1$ passes in the timer $T_1$ (step S8), the injector 11 is valve-closed in a step S9. If the number reaches the predetermined number X+Y, the injector 12 of the #2 cylinder is valve-opened in a step S10 and the timer $T_2$ is made to start counting. Note that depending on the pulse signal numbers X and Y or a setting method of the time $t_1$ or the like, it can occur that the injectors 11 and 12 are valve-opened partly overlappingly in terms of timing. Even in such a case, the injector 11 is necessarily valve-opened at the timing earlier than that of the injector 12, and it does not occur that both are valve-opened completely simultaneously. Further, even if the operation timings of the injectors 11 and 12 partially overlap, a power stored in a capacitor can be appropriated to a driving power of the injector 11 or 12.

Thereafter, in a step S12, it is judged again whether or not the number of the pulse signals from the crank angle sensor 17 reaches the predetermined number X+Y. If the number reaches the predetermined number X+Y, the injector 12 of the #2 cylinder is valve-opened in a step S13, and the timer $T_2$ is made to count (step S14), and if a predetermined time $t_2$ passes in the timer $T_2$ (step S15), the injector 12 is valve-closed in a step S16.

Figure 8:
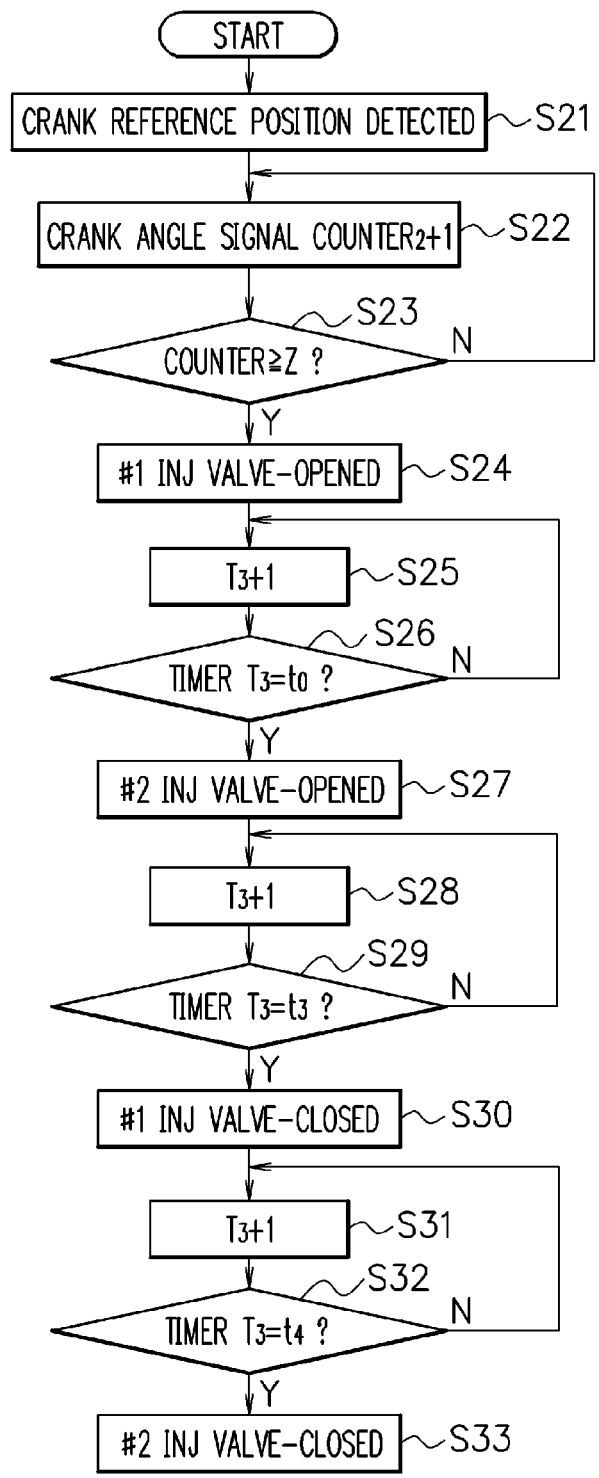
FIG. 8 is a flowchart showing an operation example of the fuel injection device at a time of crank angle synchronous actuation time injection control in the embodiment of the present invention.

FIG. 8 is a flowchart showing a flow of the crank angle synchronous actuation time injection control (2). After the crank angle asynchronous initial injection control (1), by using the signal of the crank angle sensor 17 in a step S21, the crank angle reference is detected by the toothless judgment as described above. This control is performed synchronously with the crank angle, the crank angle reference position being BTDC 75°. With such a crank angle reference position being a reference, the pulse signal from the crank angle sensor 17 is counted in a step S22, and if the number reaches a predetermined number Z (step S23), in a step S24 the injector 11 is valve-opened at a crank angle BTDC 5° in relation to the #1 cylinder in this example.

After the valve-opening of the injector 11, the timer $T_3$ is made to start counting in a step S25, and when a predetermined time $t_0$ passes in the timer $T_3$ (step S26), the injector 12 is valve-opened in a step S27.

Further, the timer $T_3$ is made to count in a step S28, and when a predetermined time $t_3$ passes in the timer $T_3$ (step S29), the injector 11 is valve-closed in a step S30.

Further, the timer $T_3$ is made to count in a step S31, and when a predetermined time $t_4$ passes in the timer $T_3$ (step S32), the injector 12 is valve-closed in a step S33.

As described above, after completion of the crank angle asynchronous initial injection control (1) and the crank angle synchronous actuation time injection control (2), combined with the toothless judgment by the signal of the crank angle sensor 17, cylinder discrimination by the cam angle sensor 18 is performed. After the cylinder discrimination, usual sequential injections are performed.

Note that since one fuel injection is performed per two rotations of the crankshaft 102, an injection is not performed after completion of the cylinder discrimination (see FIG. 6).

In the above-described case, the crank angle reference position is detected by the toothless judgment from the signal of the crank angle sensor 17, and two-cylinder simultaneous ignitions are performed as indicated by a mark ▲ in FIG. 6.

In the fuel injection device of the present invention, at the time of engine actuation, the ACG 13 is driven by hand by the recoil starter 108. On that occasion, immediately after activation of the ECU 10 and before cylinder discrimination, start timings of the fuel injections by the injectors 11, 12 of the two cylinders of the #1 and #2 are shifted by a certain time or a certain crank angle per a cylinder. Since simultaneous fuel injections are not performed for at least two or more cylinders, timings of power consumption can be dispersed as a plurality of the cylinders as a whole, so that miniaturization of the ACG 13 is practically contrived and an appropriate operation of the ECU 10 or the like is assured because of stable supply of the power.

Then, a startability of a batteryless multi-cylinder engine, in particular, can be substantially improved. Note that in a case where the timings are shifted as above, it is ready in time for an explosion by the next ignition as long as the fuel injection is completed before a compression process (see FIG. 6), no influence is given to engine actuation. Further, since the initial injection is performed asynchronously with the crank angle, that is, regardless of the crank angle, an initial explosion can be completed efficiently.

In addition to the above-described initial explosion, a second fuel injection is subsequently performed synchronously with the crank shaft before cylinder discrimination, and thereby the fuel injection can be effectively replenished. In other words, by performing the crank angle synchronous actuation time injection control (2) in combination with the crank angle asynchronous initial injection control (1) for obtaining the initial explosion, the engine startability can be effectively improved.

Further, the crank angle asynchronous initial injection control (1) and the crank angle synchronous actuation time injection control (2) are performed to all the cylinders within one rotation of the crank shaft. As described above, efficient actuation is possible at quite an early timing at the engine actuation time.

Note that when the drive timings of the injectors 11, 12 overlap power consumption of another load, for example, power distribution to an ignition capacitor, it is possible to set times after power consumption of the load as the drive timings of the injectors 11, 12. As a result of shifting the drive timings not only between the injectors 11, 12 but also in relation to another load as above, the power consumption timings are effectively dispersed, which is quite advantageous practically.

Hereinabove, the present invention is described with various embodiments, but the present invention is not limited only to these embodiments and an alteration or the like is possible within a scope of the present invention.

In the above-described embodiment, it is possible to change concrete values such as of the pulse signal number from the crank angle sensor 17 to be the reference of the start timings of fuel injections by the injectors 11, 12 and of the crank angle reference position by the toothless judgment accordingly as necessary in relation to a vehicle type or the like. Further, the present embodiment is described in the example of two-cylinder engine, but the present invention is similarly applicable also to a multi-cylinder engine of three or more cylinders, and an effect practically similar to that of the above-described embodiment can be obtained.

Further, though the example in which the present invention is applied to the outboard motor is described in the above-described embodiment, the present invention is similarly applicable also to a vehicle such as a motorcycle.

According to the present invention, when an engine is actuated by hand in particular, start timings of fuel injections among a plurality of cylinders are shifted by a certain time or by a certain crank angle per a cylinder, immediately after activation of an engine control unit. By dispersing timings of power consumption at an engine actuation time, it becomes possible to secure a power supply stably and to practically miniaturize an ACG.

What is claimed is:

1. An engine fuel injection device injecting fuel per each cylinder in an engine having a plurality of cylinders, the engine fuel injection device comprising:

a feature that implements an initial injection start time for all cylinders at an interval of a time set in advance and at least one subsequent injection start time for all cylinders and sets the initial injection start time and the at least one subsequent start time within one rotation of a crankshaft after activation of an engine control unit at an engine actuation time, wherein at least an initial fuel injection to all of the cylinders is performed asynchronously with crank angle before cylinder discrimination, wherein an engine control unit is activated and the initial fuel injection is performed immediately thereafter, wherein at least one subsequent fuel injection of to all of the cylinders is performed at a predetermined crank angle synchronously with the crankshaft before the cylinder discrimination, wherein the engine is batteryless, and wherein simultaneous fuel injections are not performed to the plurality of cylinders.

* * * * *